United States Patent
Fujii

[11] Patent Number: 5,155,364
[45] Date of Patent: Oct. 13, 1992

[54] SOLID-LIQUID REVERSIBLE SCINTILLATOR AND METHOD OF USING THE SAME

[75] Inventor: Haruo Fujii, Tokyo, Japan

[73] Assignee: Packard Instrument B.V., Groningen, Netherlands

[21] Appl. No.: 499,434

[22] PCT Filed: Feb. 23, 1989

[86] PCT No.: PCT/JP89/00189
§ 371 Date: Jun. 21, 1990
§ 102(e) Date: Jun. 21, 1990

[87] PCT Pub. No.: WO90/04796
PCT Pub. Date: May 3, 1990

[30] Foreign Application Priority Data
Oct. 28, 1988 [JP] Japan .................. 63-270860

[51] Int. Cl.$^5$ .............................. G01T 1/20
[52] U.S. Cl. ...................... 250/361 R; 250/364
[58] Field of Search ............ 250/361 R, 484.1 R, 250/362, 364; 436/57

[56] References Cited

U.S. PATENT DOCUMENTS
4,562,158 12/1985 Schellenberg .............. 250/361 R

OTHER PUBLICATIONS
Chose et al., "Principles of Radioisotope Methodology", 1967, p. 301.

Primary Examiner—Janice A. Howell
Assistant Examiner—Richard Hanig
Attorney, Agent, or Firm—Arnold, White & Durkee

[57] ABSTRACT

The present invention is a scintillator which emits light in response to radiation. The scintillator is capable of being reversibly changed between solid and liquid phases, whichever is desired, by temperature control. The scintillator comprises a fluorescent substance for converting radiation energy into light energy; a solvent which transfers radiation energy to the fluorescent substance and dissolves and diffuses the fluorescent substance and a radioactive substance acting as an object of measurement to thereby homogenize them; and a fixing substance which enables the solvent, the fluorescent substance and the radioactive substance to be fixed in a solid state and also liquified upon heating, the fixing substance being capable of phase change reversibility.

5 Claims, 2 Drawing Sheets ns is called a scintillator. Scintillators may be divided into the following classes scintillators, liquid scintillators and gas scintillators. A

SOLID-LIQUID REVERSIBLE SCINTILLATOR AND METHOD OF USING THE SAME

TECHNICAL FIELD

The present invention relates to a solid-liquid reversible scintillator and a method of using the same. More specifically, the present invention pertains to a scintillator that emits light in response to radiation, particularly a solid-liquid reversible scintillator of such type that it is possible to select either a solid phase or a liquid phase, whichever is desired, by temperature control, and a method of using such a scintillator.

BACKGROUND ART

Recently, biochemistry has been markedly advanced, and analyses of substances that constitute organisms, such as proteins, and research of metabolic functions of substances, including drugs, have been actively pursued. There has been particularly marked progress in the study of molecular biology to clarify biological phenomena on the basis of the structure and function of biopolymers. In this research, analyses of substances that constitute organisms, such as DNA and proteins, are essential requirements.

Tracers are substances which are added to obtain knowledge about the behavior of elements or substances, and experiments that employ tracers are often conducted in the fields of medical science, pharmacology, etc. To trace the behavior of an element or a compound, it is common to employ a labelled compound that contains a radioisotope of the element concerned. In the medical and pharmaceutical fields, tritium ($^3$H), carbon ($^{14}$C), etc., which are organismconstituting elements, are the principal radioisotopes used.

In a tracer experiment, information about the behavior of a target element or compound is obtained by tracing the radioactivity of a radioisotope label. Tracer experiments are also widely conducted in the fields of biochemistry, medical science and pharmacology as stated above. It is a common practice in a tracer experiment to artificially add a radioisotope (e.g., a labelled compound) to an object of measurement. Since radioisotopes are also widely distributed in nature in fixed proportions, in the form of radioisotopes produced, for example, by nuclear reactions caused by cosmic rays, it is possible to estimate the age of an organism, by analyzing the proportion of $^{14}$C in the organism. Therefore, radioisotopes are also used in research for age determination.

Scintillation is the phenomenon whereby a fluorescent substance emits light when radiation is applied thereto. Scintillation counters are used to detect -rays, X-rays, β-rays and neutron rays. Scintillation counters are arranged to convert radiation energy into light by means of a fluorescent substance, convert the light into electronic pulses by a photomultiplier tube and count the number of pulses. The above-described tracer experiments are generally conducted by the use of such scintillation counters.

Scintillation counters are capable of detecting and counting any kind of radiation, such as photon (-rays) and neutron rays, in addition to charged particles. Luminescent substances that are used in scintillation counters are called scintillators. The wavelengths of light emitted by scintillators are generally from 3000 to 6000 Angstroms. Scintillators are required to have such characteristics that they have no absorption region in the above-described wavelength range, transmit fluorescence life have a short fluorescence lifetime (which sets a limit on the decomposition time).

Scintillators may be divided into the following classes according to the phase in which they are used: solid scintillators, liquid scintillators and gas scintillators. A great variety of such scintillators have heretofore been proposed and used. For example, the invention of thallium-activated sodium iodide [NaI(Tl)], which is crystalline, was the beginning of the gamma spectroscopy. Additional examples of scintillators are thallium-activated cesium iodide [CsI(Tl)], sodium-activated cesium iodide [CsI(Na)] and europium-activated lithium iodide [LiI(Eu)].

Silver-activated zinc sulfide [ZnS(Ag)], europium-activated calcium fluoride [CaF$_2$(Eu)], bismuth germanate (BGO, Bi$_4$Ge$_3$O$_{12}$) and cesium fluoride (CsF) are also known. In addition, a glass scintillator which is made of quartz is known. Gas scintillators that employ rare gases, such as xenon, helium, etc., are considered to be high-speed scintillators, but they are usually used only for special purposes.

Liquid scintillators are often employed at the present time because they are liquids and therefore easy to handle, and they also make it possible to obtain a geometry which is advantageous to the measurement of $^3$H and $^{14}$C. The main components of liquid scintillators are an organic solvent and a dissolved fluorescent substance, but some liquid scintillators also contain a surfactant for emulsifying the organic solvent or some other additives.

The characteristics of liquid scintillators are determined by the kind of solvent, dissolved substance, surfactant, etc. selected and the amount of each material used. If, for example, xylene or toluene is employed as the solvent in a liquid scintillator, the resulting scintillator may be called a xylene-based or toluene-based liquid scintillator. A liquid scintillator which contains a surfactant may also be called an emulsifying scintillator.

As will be understood from the foregoing description, scintillators may also be considered to be substances functioning as energy transducers that convert radiation energy into fluorescent energy. In preparation of a specimen, it suffices to incorporate a radioactive substance into a solution which is in the form of a scintillation cocktail.

The solid, liquid and gas scintillators described above are all used in such a state that they are irradiated with radiation emitted from objects of measurement. Many liquid scintillators are generally used in the form of a mixture with an object of measurement which is contained in a glass container.

DISCLOSURE OF THE INVENTION

What is common to the conventional solid and liquid scintillators is that the measurement is carried out without a change in phase (solid or liquid) of the scintillator employed after the preparation thereof. As a result, it is difficult to obtain excellent measuring conditions due to the configuration, size and other physical restrictions on a specimen which is to be measured, depending upon the type of specimen.

Liquid scintillators have the further problem that the preparation and handling of specimens are complicated and a large number of steps are needed. In addition, a large amount of organic solvent mixed with a radioactive substance is generated after use. There is also a fire hazard if the used organic solvent is not properly handled and stored. The present invention has solved the problems described above and aims at attaining the following objects.

It is an object of the present invention to provide a solid-liquid reversible scintillator which is contrived so that it is possible to select a solid or liquid phase as desired simply by temperature control.

It is another object of the present invention to provide a solid-liquid reversible scintillator which facilitates preparation of a specimen for measurement It is still another object of the present invention to provide a solid-liquid reversible scintillator which enables selection of a solid or liquid phase and has improved scintillation performance in comparison with the conventional scintillators.

To attain these objects, the present invention provides a solid-liquid reversible scintillator (hereinafter referred to simply as "scintillator") which comprises a flourescent substance for converting rediation energy into light energy; a solvent which dissolves the fluorescent substance, transfers radiation energy to the fluorescent substance and wets, dissolves, and diffuses a radioactive substance acting as an object of measurement to thereby coat it uniformly; and a fixing substance which enables the solvent and the fluorescent substance to be fixed in a solid state and also liquified upon heating, the fixing substance being capable of reversible phase changes.

Scintillators may be roughly classified into inorganic scintillators and organic scintillators according to the kind of material. According to this classification, the present invention belongs to organic scintillators and comprises an organic solvent; a substance which is capable of reversibly changing between solid and liquid phases, that is, a fixing substance for fixing an object of measurement, and a dissolved fluorescent substance. The scintillator according to the present invention comprises an organic solvent, a fixing substance which preferably changes between liquid and solid phases on the basis of temperature, and a dissolved fluorescent substance. Any of the known organic solvents may be selected as desired in accordance with, for example, the nature of the object of measurement. The fixing substances is, more specifically, a surface-active agent or a paraffin.

Paraffins are known saturated hydrocarbon compounds having a molecular weight of about 300 to 500 and consisting essentially of straight-chain hydrocarbons having an average carbon number of about 20 to 35. Surface-active agents are widely used as detergents and are know to be substances having various kinds of properties such as emulsifability, dispersability, solubilizability and foamability. The surface-active agent used in the present invention functions both as an agent for emulsifying and dispersing an organic solvent as in the prior art and as a fixing substance. The surface-active agent that is used in the present invention is preferably a nonionic surface-active agent which is solid at an ordinary temperature and liquifies upon heating.

However, the fixing substance is not necessarily limited to these two kinds of substances. It is possible to employ any substance which is capable of being reversibly shifted between solid and liquid phases by temperature control. It is possible to vary the melting point of the scintillator according to the present invention by changing the mixing ratio of the fixing substance (nonionic surface-active agent or paraffin) to the organic solvent. This utilizes the principle that the melting point moves up and down by a phenomenon called melting point lowering.

The setting of the melting point is effected by changing the mixing ratio with the nature of the object of measurement and ease of handling being taken into consideration. It is preferably that the scintillator should liquify at a temperature not lower than 30° C. Therefore, it is possible according to the scintillator of the present invention to select a configuration, size, etc. as desired in accordance with the container into which it is poured and obtain a desired configuration by cooling it. It is preferable to set the melting point at a temperature which is slightly higher than the ambient temperature, that is, room temperature in normal cases. This is because the heated liquid scintillator can be solidified simply by allowing it to stand indoors.

Further, in the case where the scintillator is coated on a specimen for measurement, it is also possible to readily obtain a desired specimen simply by dropping the scintillator which has been melted by heating onto a specimen or by dipping the specimen in the molten scintillator. The scintillator, when in a liquid state, wets and diffuses into a specimen for measurement to thereby coat it uniformly. Therefore, it is possible to prepare a uniform specimen irrespective of the configuration and size thereof.

The results of measurement are superior in reproducibility, and handling of the specimen is facilitated by solidifying the scintillator. Since the scintillator of the present invention is reversibly changed between the solid and liquid phases by controlling the level of temperature, it is possible to handle it in the desired state at all times. The used scintillator has a relatively small volume, which is 1/50 to 1/100 of that of a liquid scintillator, and therefore the disposal of the used scintillator is relatively easy.

BEST MODE FOR CARRYING OUT THE INVENTION

Embodiment 1

The scintillator according to the first embodiment has the following composition:

| Ingredients | Mixing ratio |
| --- | --- |
| xylene | 250 ml |
| paraffin | 500 g |
| PPO | 5 g |
| bis-MSB | 0.8 g |

Embodiment 2

The scintillator according to the second embodiment has the following composition:

| Ingredients | Mixing ratio |
| --- | --- |
| pseudocumene | 250 ml |
| paraffin | 500 g |
| PPO | 5 g |
| bis-MSB | 0.8 g |

Embodiment 3

The scintillator according to the third embodiment has the following composition:

| Ingredients | Mixing ratio |
| --- | --- |
| isopropyl naphthalene | 250 ml |
| paraffin | 500 g |
| PPO | 5 g |
| bis-MSB | 0.8 g |

Embodiment 4

The scintillator according to the fourth embodiment has the following composition:

| Ingredient | Mixing ratio |
| --- | --- |
| isopropyl naphthalene | 400 g |
| nonionic surfactant (solid type) | 500 g |
| PPO | 5 g |
| bis-MSB | 0.6 g |

Embodiment 5

The scintillator according to the fifth embodiment has the following composition:

| Ingredients | Mixing ratio |
| --- | --- |
| pseudocumene | 350 g |
| nonionic surfactant (solid type) | 500 g |
| PPO | 5 g |
| bis-MSB | 0.6 g |

It should be noted that the following materials were employed in each of the embodiments described above.

a. The xylene and pseudocumene used as organic solvents are manufactured by Wako Pure Chemical Industries Ltd. (Japan). The isopropyl naphthalene is available from Tokyo Kasei Kogyo Co., Ltd. (Japan). Xylene and pseudocumene are mixtures of o-, m- and p-xylenes. For both the reagents, guaranteed reagents according to Japanese Industrial Standard (JIS) are used. The organic solvents function as transfer agents that transfer radiation energy to fluorescent substances.

b. The paraffins are manufactured by Nitton Seiro Co., Ltd. (Japan). The type of the paraffin used in the first embodiment is 115 and that in the second embodiment is SP-0110. The nonionic surfactants are manufactured by Lion Fat & Oil Co., Ltd. (Japan) and they are polyoxyethylene alkyl phenyl ether type nonionic surfactants. The trade name of the nonionic surfactant used in the fourth embodiment is "Liponox NCT" and that in the fifth embodiment is "Liponox NC2Y". The paraffins and nonionic surfactants function as fixing agents which can be reversibly controlled by temperature.

c. PPO is a fluorescent substance which is available from Packard Instrument Company (U.S.A.). Similarly, bis-MSB is a fluorescent substance (functioning as a secondary scintillator) which is available from Packard Instrument Company (U.S.A.). PPO and bis-MSB are abbreviations for 2,5-diphenyloxazole and P-bis(O-methyl styryl)-benzene, respectively. The melting point of the scintillator in each of the embodiments described above is about 35° C.

METHOD OF USE

Figure 1:
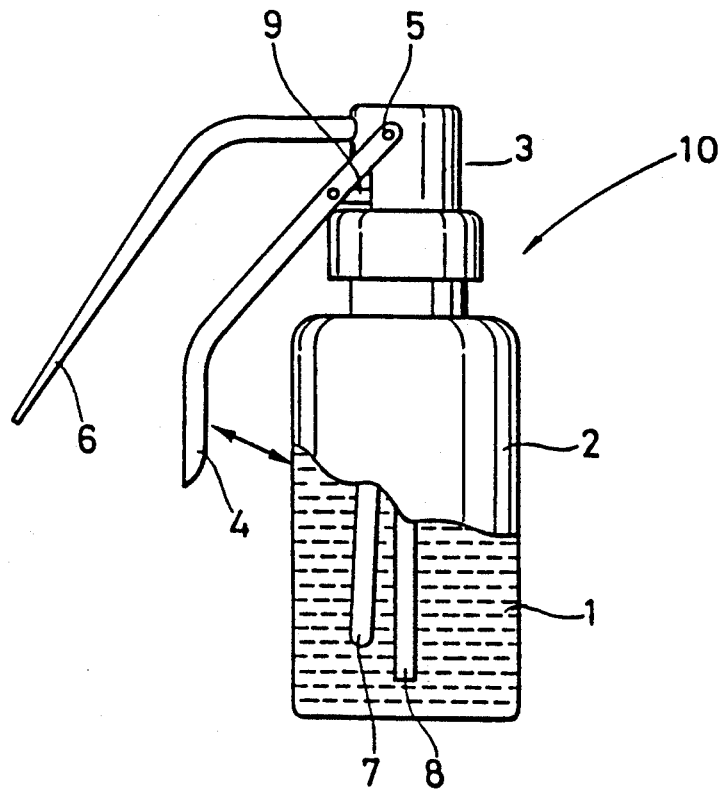
FIG. 1 shows an example of a simple and easy container for handling a solid-liquid scintillator.

FIG. 1 shows a container 10 for dispensing the scintillator according to the present invention in a small quantity at a time. The container 10 has a cap 3 which is in threaded engagement with the opening provided at the upper end thereof. The cap 3 is provided with a handle 4 in such a manner that the handle 4 is pivotal about a shaft 5. A pump 9 is provided near the base of the handle 4. By moving the handle 4 back and forth, a proper quantity of scintillator 1 is discharged from a nozzle 6 by means of the pump 9. The cap 3 is provided with the nozzle 6 formed from a pipe for dispensing the scintillator 1 from the container body 2 in a small quantity at a time. The nozzle 6 is connected to a pipe 8 provided inside the container body 2. Further, the container 2 has a bar-shaped heater 7 inserted therein to constantly heat the scintillator 1 in the container body 2 to such an extent that the scintillator 1 is maintained in the form of a liquid.

Figure 2:
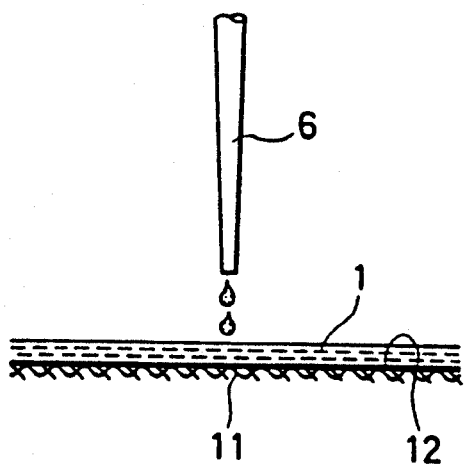
FIG. 2 is a sectional view showing an example in which a solid-liquid scintillator is coated on a filter in use.

The heater 7 is a means for electrically heating with a nichrome wire or the like and is connected to a power supply (not shown), such as a battery. Thus, the scintillator 1 is maintained at a constant temperature by a control means, such as a bimetal (not shown). FIG. 2 is a sectional view showing the way in which the scintillator 1 of the present invention is dispensed in drops using the above-described scintillator container 10. The object 12 of measurement is attached by a known means to a filter 11 formed from paper, cloth, glass fiber, various kinds of polymer film, ion-exchange membrane of the like which is employed for the purpose of filtration. The solid-liquid scintillator 1, which is in liquid form, is distributed substantially uniformly over the object 12 of measurement by actuating the handle 4.

Figure 3:
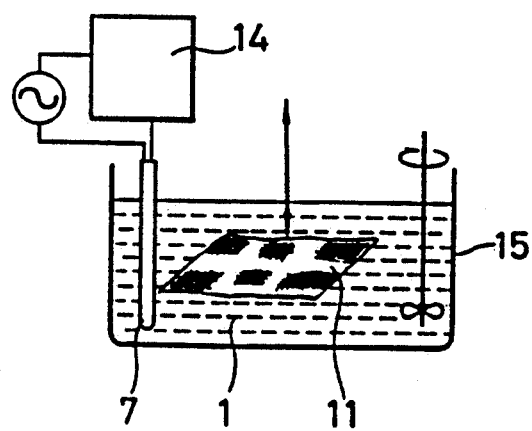
FIG. 3 is a sectional view showing an example in which an object of measurement is dipped in a solid-liquid scintillator so as to be coated therewith in use.

FIG. 3 shows another example in which the scintillator container 10 is not used. An open container 15 is filled with the scintillator 1. A heater 7 is inserted in the container 15 to heat the scintillator 1 so that it is maintained in the form of a liquid. The heater 7 is controlled by a temperature controller 14 to maintain the scintillator 1 at a proper temperature so that the scintillator 1 is in the form of a liquid at all times. A filter 11 having the object 12 of measurement attached thereto is dipped in the liquid scintillator 1 and then removed therefrom. When the filter 11 is removed, the scintillator 1 is cooled down to the ambient temperature to become a solid. Next, the object 12 and the filter 11 are put into a specimen bag (not shown) made, for example, of polyethylene. The speciment bag is put into a glass or plastic container to carry out the measurement in the same manner as in the prior art.

Figure 4:
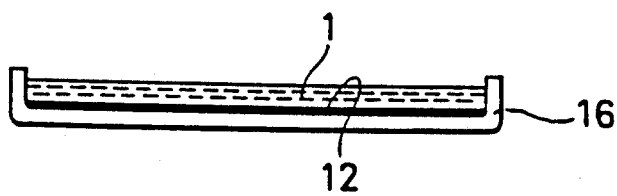
FIG. 4 is a sectional view showing an example in which a solid-liquid scintillator is placed in a transparent container in use.

FIG. 4 shows still another example. An object 12 of measurement is uniformly distributed on the bottom surface of a container 16 made of a light-transmitting material, such as a synthetic resin or glass material, and water is evaporated. In this state, the scintillator 1 is dispensed from the scintillator container 10 or the like so as to be uniformly placed on the object 12, and then the measurement is carried out. In this example, the filter 11 described above is not used; however, it is also possible to put a filter having the object 12 attached thereto on the bottom surface of the container 16 and place the scintillator 1 thereon.

Figure 5A:
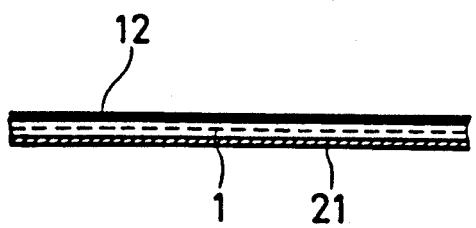
FIGS. 5(a) and 5(b) are sectional views each showing an example in which a solid-liquid scintillator is previously coated on a film-like substance.
Figure 5B:
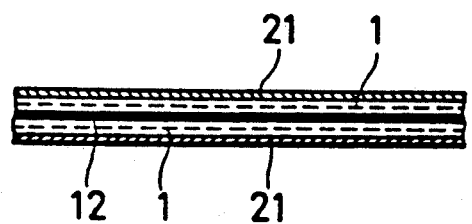

FIG. 5 shows a further example. A thin transparent sheet 21 made, for example, of polyethylene uniformly coated with the scintillator 1 to a predetermined thickness is prepared (in advance). When it is be used, the transparent sheet 21 is cut into a size which is conformable to the size of a specimen and attached to one side [FIG. 5(a)] or each side [FIG. 5(b)] of an object 12 of measurement. In either case, the measurement which is carried out thereafter is made in the same way as in the prior art.

I claim:

1. A solid-liquid reversible scintillating composition comprising: a fluorescent substance for converting radiation energy into light energy; a solvent which dissolves said fluorescent substance, transfers radiation energy to said fluorescent substance and wets, dissolves, and diffuses a radioactive substance acting as an object of measurement to thereby coat it uniformly; and a fixing substance which enables said solvent and said fluorescent substance to be fixed in a solid state and liquified upon heating, said fixing substance being capable of phase change reversibility.

2. The solid-liquid reversible scintillating composition according to claim 1, wherein said fixing substance solidifies at an ambient temperature and liquifies at a temperature slightly higher than the ambient temperature.

3. The solid-liquid reversible scintillating composition according to claim 1, wherein said fixing substance is a paraffin.

4. The solid-liquid reversible scintillating composition according to claim 1, wherein said fixing substance is a surface-active agent.

5. A method of using a solid-liquid reversible scintillating composition, comprising the steps of:
(a) formulating a solid-liquid reversible scintillating composition comprising a fluorescent substance for converting radiation energy into light energy, a solvent which dissolves and transfers radiation energy to said fluorescent substance, and a fixing substance which enables said solvent and said fluorescent substance to be fixed in a solid state and liquified upon heating, said fixing substance being capable of phase change reversibility;
(b) heating said solid-liquid reversible scintillating composition to a temperature not lower than the melting temperature thereof;
(c) attaching said molten solid-liquid reversible scintillating composition to an object of measurement having a radioactive substance;
(d) cooling said solid-liquid reversible scintillating composition attached to said object so that said scintillating composition is changed into a solid phase; and
(e) measuring said radioactive substance in said solid-liquid reversible scintillating composition including said object which is in a solid phase.

* * * * *